United States Patent Office 2,864,803
Patented Dec. 16, 1958

2,864,803

ALPHA-BETA UNSATURATED DICARBOXYLIC ACID-VINYL ALKYL ETHER COPOLYMERS STABILIZED WITH A WATER SOLUBLE THIO-AMIDE

John F. Jones, Cuyahoga Falls, Ohio, assignor to The B. F. Goodrich Company, New York, N. Y., a corporation of New York No Drawing. Application November 30, 1954
Serial No. 472,257

18 Claims. (Cl. 260—45.8)

This invention relates to stabilized hydrophilic water-swellable polymers and more particularly pertains to interpolymers of (1) alpha-beta unsaturated polybasic acids or their anhydrides, and (2) vinyl-alkyl ethers with or without (3) polyunsaturated cross-linking agents, to which interpolymers a water-soluble thioamide is added to stabilize aqueous mucilages of the polymers against extreme viscosity decreases. This invention also relates to methods of stabilizing alpha-beta unsaturated polybasic acid or alpha-beta unsaturated polybasic anhydride-vinyl alkyl ether interpolymers by the admixture of a water-soluble, organic thioamide with the interpolymer.

In my copending application Serial No. 404,784, filed January 18, 1954, there are disclosed a number of hydrophilic polymers which are formed by the conjoint polymerization of polybasic, alpha-beta unsaturated acids or anhydrides, vinyl alkyl ethers, and poly-unsaturated cross-linking agents. The acid or acid anhydride forms of the cross-linked interpolymers can be converted to salts, partial esters or partial amides. These cross-linked polymeric derivatives are not truly soluble in water or in alkaline aqueous media, but they do possess the characteristic of being able to swell in water to form viscous mucilages or gels at low concentrations and over a fairly wide pH range. The mucilages and gels are excellent emulsifying and suspending agents when freshly prepared, but they have the disadvantage of gradually losing their viscosity over a period of several months. Linear or non-cross-linked copolymers of alpha-beta unsaturated acids or anhydrides thereof and alkyl vinyl ethers and partial esters, amides and salts also form viscous mucilages at relatively high concentrations in aqueous media and these mucilages also undergo severe decreases in viscosity on standing over a period of time. This viscosity loss is so marked in some instances that the viscosity retention of the polymer in about 2 months in aqueous media is less than 10% of that of the freshly prepared mucilage. Another undesirable effect in aqueous mucilages of conjoint polymers of polyhydric alpha-beta unsaturated acids or anhydrides and vinyl alkyl ethers, whether cross-linked or not, is the development of a dark color on standing. This latter undesirable characteristic is also controlled by the same stabilizing ingredients that prevents viscosity loss.

It is an object of this invention to provide polymers of polyhydric alpha-beta unsaturated acids or anhydrides, and vinyl alkyl ethers, with or without polyunsaturated cross-linking agents, which polymers have viscosity stability in aqueous media over long periods of time by the admixture of a stabilizing ingredient having the formula

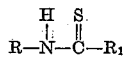

to the polymer. This structural formula is generic for the thioamides which are useful in this invention, specific examples of which are more fully described hereinafter.

Another object is the provision of a salt, partial ester or partial amide derivative of an alpha-beta unsaturated dibasic acid anhydride, and a vinyl alkyl ether with or without a minor amount of polyunsaturated cross-linking agent, which interpolymer contains a water-soluble thioamide described above as a viscosity stabilizing ingredient.

Numerous other objects will be apparent from the following detailed description of the preferred embodiment of the invention.

The above objects are accomplished by first preparing the polymers described hereinabove and then adding a suitable quantity of stabilizing ingredient, usually in the range of about 0.05 to about 2% or more by weight based on the mucilage or 3 to 120% based on the dry copolymer. The stabilizing ingredient can be added to the dry polymer or it can be added to an aqueous mucilage.

Specific water-soluble thiomaides that can be employed as stabilizing ingredients include thiourea, methyl thiourea, ethyl thiourea, the propyl, butyl, amyl and hexyl thioureas, thioacetamide, thioacetanilide, thiosemicarbazide, dithiobiuret, ethylene thiourea, allyl thiourea, acetyl thiourea and 2-mercaptobenzimidazole. Each of these compounds conforms to the generic structure

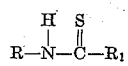

in that each contains a carbon atom attached directly to a sulfur atom by a double bond and to a nitrogen atom. 2-mercaptobenzimidazole forms a tautomer which can be defined as a monophenyl derivative of thiourea in which each nitrogen atom of thiourea is attached to an adjacent nuclear carbon atom of a benzene ring and which has the following structure:

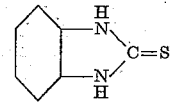

The stabilizing ingredients have the generic formula:

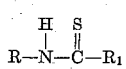

in which R represents hydrogen, or a phenyl group, $R_1$ represents —$NH_2$,

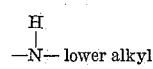

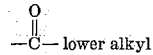

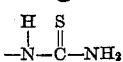

and

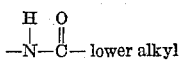

and R and R₁ collectively represent the

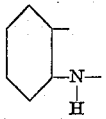

residue of mercaptobenzimidazole.

The amount of stabilizing ingredient needed to prevent drastic losses in viscosity of aqueous mucilages of the polymers will vary somewhat depending on conditions under which the polymeric mucilage is held and the effectiveness of the particular stabilizing ingredient. In general, however, amounts of stabilizing ingredient ranging from about .1% to about 2% by weight based on the weight of mucilage or 6 to 120% based on the dry polymer is sufficient to show a marked improvement in viscosity retention. Of the specific compounds enumerated above acetyl thiourea and 2-mercaptobenzimidazole exhibit the greatest protective effect against viscosity loss even at very low concentrations of from .1 to .3% by weight based on the mucilage.

The polymers are prepared from two essential monomeric materials, namely, (1) an alpha-beta unsaturated dicarboxylic acid anhydride, and (2) an alkyl vinyl ether in which the alkyl portion of the molecule has from 1 to 8 carbon atoms. The cross-linked interpolymers contain a poly-unsaturated cross-linking agent as an additional essential ingredient.

The dicarboxylic acid anhydrides have the general structure:

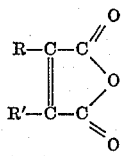

wherein R and R' are selected from the group consisting of hydrogen, halogen, cyanogen, alkyl, aryl, alkaryl, aralkyl and cycloaliphatic groups. Illustrative anhydrides include maleic anhydride, chloromaleic anhydride, 2,3-dicyano maleic anhydride, 2,3-dimethyl maleic anhydride, 2,3-diphenyl maleic anhydride, 2,3-dibenzyl maleic anhydride, 2,3-di-(P-methylphenyl) maleic anhydride, 2,3-dicyclohexyl maleic anhydride, 2-methyl maleic anhydride, 2-ethyl maleic anhydride, 2-cyano maleic anhydride, 2-propyl maleic anhydride, 2-phenyl maleic anhydride, 2-benzyl maleic anhydride, 2(P-methylphenyl) maleic anhydride, and 2-cyclohexyl maleic anhydride. Maleic anhydride is preferred because of its ready availability and comparatively low cost. The polybasic acid moieties of the polymers of this invention are those which result from the hydrolysis of the anhydride-linkage of the above anhydrides.

The vinyl ether monomers include vinyl methyl ether, vinyl ethyl ether, vinyl propyl ether, vinyl isopropyl ether, vinyl butyl ethers, vinyl hexyl ethers, vinyl 2-ethylhexyl ether and vinyl octyl ethers. The ethers in which the alkyl group has from 1 to 4 carbon atoms are preferred. Among the preferred class of vinyl ethers are methyl vinyl ether, ethyl vinyl ether, propyl vinyl ethers and the butyl vinyl ethers.

The third monomeric material, which is optional, is a cross-linking agent which contains a plurality of polymerizable $CH_2=C<$ groupings and which is copolymerizable with the alpha-beta unsaturated acid anhydride and the vinyl alkyl ether monomers to form cross-linked water-swellable terpolymers. Illustrative cross-linking agents include the polyunsaturated hydrocarbons such as divinyl benzene, divinyl naphthalene, divinyl cyclohexane, polymerized dienes such as polybutadiene and other conjugated diene polymers having substantial unsaturation remaining in the molecule; unsaturated sulfones such as hexaallyl trimethylene trisulfone; unsaturated amides such as trimethacrylyl triazine; di- and polyunsaturated esters such as ethylene glycol diacrylate, allyl acrylate, allyl cinnamate, diallyl maleate, diallyl phthalate, diallyl malonate, etc.; polyunsaturated acids such as beta-styryl acrylic acid, etc.; polyunsaturated anhydrides such as acrylic anhydride, methacrylic anhydride, etc.; polyunsaturated ethers such as divinyl ether, diallyl ether, diallyl ethylene glycol ether, 1,4,5,8-naphthalene tetrol ethers, the vinyl, allyl, methallyl and crotyl polyethers containing 2 to 7 or more alkenyl ether groups per molecule; polyunsaturated ketones such as divinyl ketone and diallyl ketone; and polyunsaturated compounds containing one or more functional groups such as the half ethers, allyl-beta-allyloxy propionate and allyl methacrylyl sucrose, the half ester monoallyl maleate, the partial ethers of polyhydric alcohols such as diallyl glycerol ether, polyallyl sucrose, polyallyl glucose and other polyallyl derivatives of carbohydrates and polyalcohols, including polyallyl sorbitol, polyallyl mannitol and other polyallyl ethers of sugar-derived acohols. The carbohydrate polyallyl ethers contain 3 or more allyl groups on each molecule. In this specification the term polyallyl when used to modify the name of a chemical which has more than one organic hydroxyl group, is meant to describe a monomer which has a plurality of allyl groups attached to the molecule through ether linkages.

The preferred class of cross-linking agents are the polyunsaturated hydrocarbons, solvent soluble polymeric open-chain aliphatic conjugated dienes, and the polyalkenyl polyethers of polyalcohols containing at least 4 carbon atoms and at least 3 hydroxyl groups. All of these preferred cross-linking agents must contain a plurality of polymerizable $CH_2=C<$ groups, the double bonds of which are not in conjugated relationship one with the other. Specific examples of the latter include polyallyl glucose, polyallyl sucrose, polyallyl levulose, polyallyl erythritol, polyallyl pentaerythritol, polyallyl sorbitol, polyallyl mannitol and the polyallyl disaccarides. The amount of cross-linking agent can vary from about 0.1% to about 10% of the combined weight of the remaining monomers.

Maleic acid anhydride and its substituted derivatives tend to form alternating copolymers with many other monomers with which they are copolymerizable. Therefore, substantially molar equivalents of the anhydrides and alkyl vinyl ethers should be used in preparing both the non-cross-linked and the cross-linked polymer. If desired, however, up to about 20% of the total monomeric mixture can consist of other monoolefinic monomers such as styrene, acrylonitrile, vinyl chloride, vinylidene chloride, vinyl acetate, vinyl benzoate, diethyl maleate, ethylene, isobutylene or acrylic acid. In preparing cross-linked polymers, it is preferred to use only the essential monomeric materials described heretofore, namely, a maleic anhydride, a vinyl alkyl ether and a cross-linking agent.

Both the cross-linked and non-cross-linked polymers can be converted to a partial ester, partial amides or salts by reaction with a primary or secondary alcohol, ammonia or a primary or secondary amine or an inorganic metallic alkaline material. Representative alcohols are preferably aliphatic types having from 1 to about 18 carbon atoms. The amines may be either aliphatic or aromatic and must have at least one replaceable hydrogen on the amine nitrogen. The number of carbon atoms in the amine can vary from 1 to 18. The preferred salt forming groups are those of the alkali metals. Methods of preparing these derivatives are described in detail in my copending application, Serial No. 404,784.

The specific examples which follow are intended to describe in detail the mode of practicing this invention but are not to be construed as limitations thereon.

EXAMPLE I

A polymer of equimolar proportions of maleic anhydride and methyl vinyl ether with 1%, based on the above monomers, of allyl sucrose having about 5.8 allyl groups per sucrose molecule, as a cross-linking agent, was prepared in benzene at a temperature of 50° C. in the presence of 2% benzoyl peroxide. The polymer was filtered, then dried and a series of mucilages was prepared from the polymer by neutralizing about 75% of anhydride or carboxyl groups with aqueous NaOH. The amount of water was adjusted to yield a mucilage having 1.5% by weight of polymer. One of the mucilages was retained as a control. Thiourea was added in varying quantities to the remaining samples. The mucilages were then stoppered and stored at 50° C. The results of these tests are tabulated below.

Table I

| Percent: Thiourea added to mucilage | 0 | 0.05 | 0.1 | 0.3 | 0.5 |
|---|---|---|---|---|---|
| Initial Viscosity (Poises) | 1,480 | 1,540 | 1,320 | 1,380 | 1,360 |
| Viscosity in 7 weeks (Poises) | 136 | 712 | 808 | 1,000 | 960 |

EXAMPLE II

Thiourea is also effective in stabilizing other mucilage-forming, cross-linked terpolymers containing maleic anhydride as one of the ingredients in the polymer, with various comonomers and various cross-linking agents. The cross-linked polymers were prepared by the method described in Example I. Partial esters of some of the polymers were made by treating the solid polymer in benzene with an alcohol in the presence of a small quantity of an amine catalyst. The lauryl ester was made by reacting 0.2 molar equivalent of lauryl alcohol with the polymer and the methyl ester was prepared by reacting one molar equivalent with the polymer.

EXAMPLE III

A cross-linked interpolymer of equimolar quantities of maleic anhydride and methyl vinyl ether together with 1% allyl sucrose was prepared in benzene at 50° C. using benzoyl peroxide as a polymerization catalyst. The finely divided precipitate was filtered and dried at 50° C. Mucilages containing 1.5% of the polymer were prepared by adding the polymer to water and neutralizing with NaOH until about 75% of the carboxyl or potential carboxyl groups were converted to the sodium salts and adjusting the water content. Water-soluble thioamides were added to the mucilages to determine the stabilizing effect on the mucilages. The mucilages were held for seven weeks at a temperature of 50° C. The results of these tests are tabulated below.

Table III

| Thioamide | Percent by Weight of Thioamide in Mucilage | | | | | | | | | | |
|---|---|---|---|---|---|---|---|---|---|---|---|
| Dithiobiuret | 0 | 0.1 | 0.3 | | | | | | | | |
| Ethylene thiourea | 0 | | | 0.1 | 0.3 | | | | | | |
| Acetyl thiourea | 0 | | | | | 0.1 | 0.3 | | | | |
| 2-Mercapto Benzimidazole | 0 | | | | | | | 0.1 | 0.3 | | |
| Allyl thiourea | 0 | | | | | | | | | 0.1 | 0.3 |
| Initial Viscosity of Mucilage | 672 | 576 | 608 | 696 | 720 | 700 | 640 | 646 | 668 | 720 | 756 |
| Final Viscosity of Mucilage | 40 | 32 | 160 | 320 | 400 | 400 | 400 | 380 | 400 | 320 | 340 |

EXAMPLE IV

In another group of tests, several cross-linked maleic anhydride-methyl vinyl ether terpolymers with different cross-linking agents were prepared. Mucilages containing 1.5% of the polymers were made by converting the anhydride form of the polymer to the partial sodium salt as hereinbefore described and adjusting the water content. Various thioamides were added to the mucilages which were then held at a temperature of 50° C. for two weeks. The results of these tests are tabulated below.

Table IV

| Cross-linking Ingredient | Percent Cross-linking Ingredient in Polymer | Stabilizer | Viscosity | |
|---|---|---|---|---|
| | | | Initial | After 2 Weeks at 50° C. |
| Triallyl phloroglucinol. | 2 | None | 96 | 0 |
| | | 0.3% thiourea | 112 | 144 |
| Hexaallyl-trimethylene trisulfone. | 2 | None | 56 | 0 |
| | | 0.3% acetyl-thiourea. | 44 | 92 |
| Trimethacrylyl triazine. | 2 | None | 44 | 0 |
| | | 0.3% 2-mercapto-benzimidazole. | 80 | 40 |

Table II.—Thiourea stabilized cross-linked polymers

| Monomers in Polymer | Percent Cross-Linking agent | Alcohol | Percent Thiourea in mucilage | Initial Viscosity (Poises) 1.5% mucilage | Viscosity (Poises) after 5 wks. at 50° C. |
|---|---|---|---|---|---|
| Maleic anhydride / Methyl vinyl ether | (¹) | | None | 136 | 24 |
| | | | 0.3 | 168 | 84 |
| Maleic anhydride / Vinyl acetate | 4% allyl sucrose | | None | 400 | 101 |
| | | | 0.3 | 302 | 191 |
| Maleic anhydride / Methyl vinyl ether | 2% methylene-bis-acrylamide | | None | 570 | 120 |
| | | | 0.3 | 570 | 215 |
| Maleic anhydride / Methyl vinyl ether | 4% hexaallyl-trimethylene trisulfone | | None | 245 | 63 |
| | | | 0.3 | 270 | 178 |
| Maleic anhydride / Methyl vinyl ether | 1% allyl sucrose | Lauryl | None | 245 | 105 |
| | | | 0.3 | 223 | 145 |
| Maleic anhydride / Methyl vinyl ether | do | Methyl | None | 32 | 4 |
| | | | 0.3 | 56 | 40 |
| Maleic anhydride / Methyl vinyl ether | do | Lauryl | None | 765 | 175 |
| | | | 0.3 | 800 | 330 |
| Maleic anhydride / Methyl vinyl ether | 1% methylene-bis-acrylamide | do | None | 128 | ² 20 |
| | | | 0.3 | 145 | 55 |

¹ 6% of a polyester of glycerol ethylene, glycol maleic anhydride phthalic anhydride having sufficient unsaturation to make it reactive with other unsaturated monomers.
² These results were taken after 4 weeks at 50° C.

EXAMPLE V

A cross-linked polymer of equimolar proportions of maleic anhydride and methyl vinyl ether with 3% of polyallyl sucrose based on the other monomers was prepared. A mucilage containing 1.5% of the polymer was made by neutralizing the polymer with aqueous sodium hydroxide to a pH of 7 and adjusting the water content. A stabilizing ingredient was dissolved in the mucilage and the mucilage was then stored in closed containers for three weeks at 50° C.

The results of these tests are shown in Table V.

Table V

| Stabilizing Ingredient | Percent Stabilizing Ingredient in Mucilage | Viscosity Initial | Viscosity After Three Weeks |
|---|---|---|---|
| None | | 1,420 | 740 |
| Thiourea | 0.3 | 1,400 | 1,220 |
| 2-Mercapto benzimidazole | 0.3 | 1,400 | 1,000 |
| Acetyl thiourea | 0.3 | 960 | 840 |

EXAMPLE VI

A linear, non-cross-linked copolymer of equimolar quantities of maleic anhydride and methyl vinyl ether was prepared by following the procedure of Example I. The polymer was dissolved in water and neutralized to approximately pH 7 with aqueous sodium hydroxide. At this pH about 75% of the carboxyl groups are neutralized. Water was then added to form a mucilage having a concentration of about 15% polymer by weight. An aliquot of the polymer was removed from the master batch, its viscosity was determined and then it was placed in a bottle, stoppered and stored at 50° C.

The remainder of the mucilage was subdivided into three portions and a viscosity stabilizer was added. The initial viscosities were taken. The mucilages were then placed in bottles, stoppered and stored at 50° C. The results of these tests are summarized in Table VI.

Table VI

| Stabilizing Ingredient | Percent Stabilizer Based on Polymer | Percent Polymer in Mucilage | Initial Viscosity (Poises) | Viscosity after 2 Weeks at 50° C. |
|---|---|---|---|---|
| None | | 15 | 480 | 88 |
| Thiourea | 30 | 15 | 448 | 232 |
| | 15 | 15 | 456 | 240 |
| Acetyl thiourea | 30 | 15 | 450 | 260 |

In all instances the viscosities of the mucilages containing cross-linked polymers were determined on a Brookfield Viscosimeter No. 7 spindle at 20 R. P. M., and the viscosities of mucilages containing linear polymers were determined with the same viscosimeter using a Helepath attachment, and a No. 4 spindle at 4 R. P. M.

It is to be understood that cross-linked polymers made from other combinations of monomers disclosed herein are also stabilized by these water-soluble thioamides.

The polymers are excellent suspending, thickening and emulsifying agents. Addition of the stabilizing agent increases the useful life of the mucilages as much as three fold or more.

Although I have disclosed specific examples, they are intended to illustrate the means of practicing the invention and not as limitations thereon, for it is evident that variations and modifications can be made without departing from the spirit and scope of the invention as defined in the claims.

I claim:

1. A composition comprising a member selected from the class consisting of (A) interpolymers of substantially equimolar proportions of (1) alpha-beta unsaturated dicarboxylic acids and anhydrides thereof and (2) vinyl alkyl ethers in which the alkyl group has from 1 to 10 carbon atoms and (B) interpolymers of substantially equimolar proportions of (1) and (2) and from 0.1 to about 10% by weight of the combined weight of said (1) and (2) of an ingredient having a plurality of $CH_2=C<$ groups which ingredient is copolymerizable with (1) and (2) to form cross-linked interpolymers, partial amides, partial esters of monohydric alcohols and partial alkali metal salts of (A) and (B), and a stabilizing ingredient from about 6% to about 120% by weight based on said interpolymers of a water-soluble thioamide.

2. The composition of claim 1 in which the stabilizing ingredient is thiourea.

3. The composition of claim 1 in which the stabilizing ingredient is acetyl thiourea.

4. The composition of claim 1 in which the stabilizing ingredient is 2-mercapto benzimidazole.

5. A mucilage comprising a dispersion of the composition of claim 1 in water in which the stabilizing ingredient is present in a quantity of from about 0.05% to about 5% by weight of the mucilage.

6. A mucilage comprising a dispersion of an aqueous partial alkali metal salt of a water-swellable copolymer of substantially equimolar proportions of (1) maleic anhydride, (2) methyl vinyl ether and (3) allyl ether of a polyhydric alcohol having at least 5 carbon atoms and at least 4 allyl ether groups, said allyl ether being present in said polymer in a quantity of from about 0.5 to about 5% by weight of the other monomeric materials and (4) from about 0.1 to about 0.5% by weight based on said mucilage of thiourea as a stabilizing ingredient.

7. The composition of claim 6 in which the stabilizing ingredient is acetyl thiourea.

8. The composition of claim 6 in which the stabilizing ingredient is 2-mercapto benzimidazole.

9. A method of stabilizing mucilage viscosities of linear and cross-linked, water-swellable polymers comprising polymers of substantially equimolar proportions of (1) an alpha-beta unsaturated dicarboxylic acid anhydride, and (2) a vinyl alkyl ether having from 1 to 4 carbon atoms in the alkyl group, and partial esters of monohydric alcohols, partial amides and partial alkali metal salts of said polymers by adding to an aqueous mucilage of said polymers from about 0.05 to about 5% by weight based on the mucilage of a water-soluble thioamide.

10. The method of claim 9 in which the polymer is a substantially linear copolymer of substantially equimolar proportions of maleic anhydride and methyl vinyl ether in which the alkyl group has from 1 to 4 carbon atoms, and the thioamide has the generic formula $$\underset{\underset{R}{|}}{H}\underset{\underset{}{}}{}\underset{\underset{}{}}{}\overset{S}{\underset{}{\|}}\underset{}{}$$
R—N—C—R₁ in which R represents hydrogen, $R_1$ is selected from the class consisting of —$NH_2$,

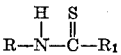

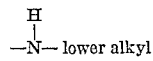

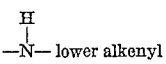

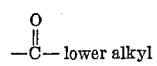

and

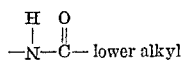

and R and $R_1$ collectively represent the

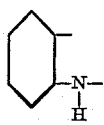

residue of mercaptobenzimidazole.

11. The method of claim 9 in which the polymer is a copolymer of substantially equal proportions of (1) maleic anhydride (2) a vinyl alkyl ether in which the alkyl group has from 1 to 4 carbon atoms and (3) a polyallyl ether of a polyalcohol having at least 5 carbon atoms and at least 4 allyl groups, said polyallyl ether being present in the polymer in a quantity of from 1 to 4% by weight of the remaining monomers and the thioamide has the generic formula $$\begin{array}{c} H\ S \\ |\ \| \\ R-N-C-R_1 \end{array}$$

in which R represents hydrogen, $R_1$ a member selected from the class consisting of $-NH_2$,

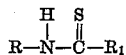

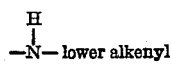

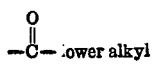

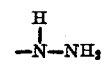

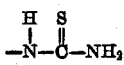

and

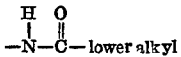

and R and $R_1$ collectively represent the

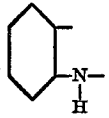

residue of mercaptobenzimidazole.

12. The method of claim 11 in which the polymer is a maleic anhydride, methyl vinyl ether, polyallyl sucrose copolymer and the stabilizing ingredient is thiourea.

13. The method of claim 10 in which the thioamide is acetyl thiourea.

14. The method of claim 10 in which thioamide is 2-mercapto benzimidazole.

15. The method of claim 11 in which the polymer is a maleic anhydride, methyl vinyl ether, polyallyl pentaerythritol copolymer and the stabilizing ingredient is thiourea.

16. The method of claim 14 in which the stabilizing ingredient is acetyl thiourea.

17. The method of claim 14 in which the stabilizing ingredient is 2-mercapto benzimidazole.

18. A composition comprising an interpolymer of substantially equimolar proportions of (1) maleic anhydride and (2) an alkyl vinyl ether in which the alkyl group contains from 1 to 10 carbon atoms and (3) from about 0.1 to about 10% by weight based on the combined weight of (1) and (2) of an ingredient having a plurality of $CH_2=C<$ groups which ingredient is copolymerizable with (1) and (2) to form cross-linked interpolymers, partial amides, partial esters of monohydric alcohols and partial alkali metal salts of said interpolymer and from about 6 to about 200% weight percent based on the interpolymer of a water-soluble stabilizing ingredient having the structure

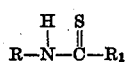

in which R represents hydrogen, $R_1$ a member selected from the class consisting of $-NH_2$,

and

and R and $R_1$ collectively represent

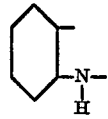

of a mercaptobenzimidazole.

References Cited in the file of this patent
UNITED STATES PATENTS

| | | |
|---|---|---|
| 2,392,041 | Groff | Jan. 1, 1946 |
| 2,609,350 | Spatt | Sept. 2, 1952 |
| 2,756,163 | Herrick | July 24, 1956 |